United States Patent
Shi et al.

(10) Patent No.: US 12,131,741 B2
(45) Date of Patent: Oct. 29, 2024

(54) AUDIO TRANSMISSION METHOD AND ELECTRONIC DEVICE

(71) Applicant: Huawei Technologies Co., Ltd., Shenzhen (CN)

(72) Inventors: Dong Shi, Singapore (SG); Jie Su, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 225 days.

(21) Appl. No.: 17/799,143

(22) PCT Filed: Feb. 5, 2021

(86) PCT No.: PCT/CN2021/075575
§ 371 (c)(1),
(2) Date: Aug. 11, 2022

(87) PCT Pub. No.: WO2021/160040
PCT Pub. Date: Aug. 19, 2021

(65) Prior Publication Data
US 2023/0069653 A1 Mar. 2, 2023

(30) Foreign Application Priority Data
Feb. 11, 2020 (CN) .......................... 202010086704.0

(51) Int. Cl.
*G10L 19/00* (2013.01)
*H04B 17/318* (2015.01)
*H04L 43/0894* (2022.01)

(52) U.S. Cl.
CPC ............ *G10L 19/00* (2013.01); *H04B 17/318* (2015.01); *H04L 43/0894* (2013.01)

(58) Field of Classification Search
CPC .... G10L 19/00; H04B 17/318; H04L 43/0894
See application file for complete search history.

(56) References Cited

U.S. PATENT DOCUMENTS

| | | | |
|---|---|---|---|
| 6,104,993 A | 8/2000 | Ashley | |
| 2006/0088127 A1* | 4/2006 | Noda | H04L 27/186 329/304 |
| 2007/0050189 A1 | 3/2007 | Cruz-Zeno et al. | |
| 2010/0191536 A1 | 7/2010 | Sampat et al. | |
| 2014/0236590 A1* | 8/2014 | Hu | G10L 21/0208 704/228 |

(Continued)

FOREIGN PATENT DOCUMENTS

| | | |
|---|---|---|
| CN | 1248339 A | 3/2000 |
| CN | 1256821 A | 6/2000 |
| CN | 101366077 A | 2/2009 |

(Continued)

*Primary Examiner* — Ibrahim Siddo
(74) *Attorney, Agent, or Firm* — Conley Rose, P.C.

(57) ABSTRACT

An audio transmission method includes: a second device sends noise energy data on the second device end and transmission efficiency data to a first device; the first device determines a first bit rate based on the noise energy data, and determines a second bit rate based on the transmission efficiency data; the first device encodes an audio stream based on a lower bit rate of the first bit rate and the second bit rate to obtain audio data; the first device sends the audio data obtained by encoding to the second device.

20 Claims, 6 Drawing Sheets

(56) References Cited

U.S. PATENT DOCUMENTS

2014/0362764 A1  12/2014  Aksu

FOREIGN PATENT DOCUMENTS

| CN | 101572585 | A | 11/2009 |
| CN | 101636951 | A | 1/2010 |
| CN | 105989844 | A | 10/2016 |
| CN | 107800665 | A | 3/2018 |
| CN | 109274405 | A | 1/2019 |
| CN | 110265046 | A | 9/2019 |
| CN | 106231629 | B | 10/2019 |
| EP | 2717260 | A1 | 4/2014 |

* cited by examiner

AUDIO TRANSMISSION METHOD AND ELECTRONIC DEVICE

CROSS-REFERENCE TO RELATED APPLICATIONS

This is a national stage of International Patent Application No. PCT/CN2021/075575 filed on Feb. 5, 2021, which claims priority to Chinese Patent Application No. 202010086704.0 filed on Feb. 11, 2020. Both of the aforementioned applications are hereby incorporated by reference in their entireties.

TECHNICAL FIELD

This application relates to the field of communications technologies, and in particular, to an audio transmission method and an electronic device.

BACKGROUND

With development of communications technologies, audio data may be transmitted between two devices in a wireless communication manner. For example, as shown in FIG. 1, a mobile phone establishes a connection to a wireless headset by using, for example, Bluetooth (Bluetooth, BT), so that the mobile phone may transmit audio data to the wireless headset through Bluetooth. The mobile phone may encode a to-be-transmitted audio stream to obtain audio data, and then transmits the audio data to the wireless headset through Bluetooth. After receiving the audio data, the wireless headset decodes the audio data to obtain the audio stream of to-be-played audio, and then plays the to-be-played audio.

In the conventional technology, to ensure that a difference between sound quality of played audio and sound quality of a sound source is minimized, the mobile phone usually performs encoding at a maximum bit rate. The maximum bit rate is a maximum bit rate that can be supported by Bluetooth signal quality during encoding by the mobile phone. However, noise may exist in an actual use scenario for a user. Therefore, the user cannot experience good sound quality at all. However, when the mobile phone encodes the audio stream at a high bit rate, not only computational complexity is high, but also power consumption for encoding, transmission, and decoding is high.

SUMMARY

This application provides an audio transmission method and an electronic device, to resolve a problem of high computational complexity and high power consumption in an existing audio transmission method.

According to a first aspect, this application provides an audio transmission method. The method includes: A first device receives noise energy data and transmission efficiency data from a second device, where the noise energy data is used to indicate noise energy or noise loudness, and the transmission efficiency data is used to indicate quality of a wireless channel between the first device and the second device. The first device determines a first bit rate based on the noise energy data, and determines a second bit rate based on the transmission efficiency data. The first device encodes an audio stream based on a lower bit rate of the first bit rate and the second bit rate, to obtain audio data. The first device sends the audio data to the second device.

In this application, there is a wireless connection relationship between the first device and the second device. The first device may be an electronic device having an audio encoding function, for example, a mobile phone, a tablet computer, a smart television, a vehicle-mounted device, or a wearable electronic device (for example, a smart band) having an audio encoding function and a wireless communication function. The second device may be an electronic device having an audio play function, for example, a wireless headset, a wireless speaker, a smart television, a tablet computer, or a music play device.

After establishing the wireless connection relationship with the second device, the first device may obtain first audio data through encoding based on a random encoding bit rate, and then send the first audio data to the second device. Then, the first device receives noise energy data on the second device end and transmission efficiency data of received audio data. Further, the first device determines the first bit rate based on the noise energy data, determines the second bit rate based on the transmission efficiency data, and encodes the audio stream based on the lower bit rate of the first bit rate and the second bit rate, to obtain the audio data. The noise energy data is used to indicate the noise energy or the noise loudness, and the transmission efficiency data is used to indicate the quality of the wireless channel between the first device and the second device.

It can be learned that in this implementation, when determining an encoding bit rate, the first device uses noise of the second device end and wireless signal quality as reference factors. In this way, a relatively low encoding bit rate can be determined, computational complexity and power consumption of encoding and decoding can be reduced, and the power consumption and a listening sense of a user can be well balanced.

In a possible design, the first bit rate includes: If it is determined that the noise energy data is less than a first threshold, the first bit rate is a first value. Alternatively, if it is determined that the noise energy data is greater than the first threshold and less than a second threshold, the first bit rate is a second value. Alternatively, if it is determined that the noise energy data is greater than the second threshold, the first bit rate is a third value. The first threshold is less than the second threshold, the first value is greater than the second value, and the second value is greater than the third value. When the noise energy data is less than the first threshold, it indicates that loudness of noise heard by the user is relatively low, and the first device may encode audio by using a relatively high encoding bit rate. When the noise energy data is greater than the first threshold and less than the second threshold, it indicates that the loudness of the noise heard by the user is relatively medium, and the first device may encode the audio by using a relatively medium encoding bit rate. When the noise energy data is greater than the second threshold, it indicates that the loudness of the noise heard by the user is relatively high, and the first device may encode the audio by using a relatively low encoding bit rate. In this implementation, complexity of encoding can be reduced, and the power consumption and the listening sense of the user can be better balanced.

In a possible design, the first value, the second value, and the third value are all preset fixed values. In some embodiments, the user has no requirement on sound quality of the audio. Correspondingly, the first device may adaptively adjust an encoding bit rate of output audio. Based on this, in this embodiment, the first value, the second value, and the third value may be preset fixed values. In this implementation, the computational complexity and power consumption of encoding and decoding can be reduced, and listening experience of the user can be kept unchanged.

In a possible design, the first value, the second value, and the third value are all preset percentages of an initial bit rate corresponding to the audio data. In some embodiments, the user may have a specific requirement on the sound quality of the audio. For example, the user may select high-quality music, and the like, and initial bit rates of audio of different sound qualities are different. Correspondingly, the first device may determine an encoding bit rate of the audio based on an initial bit rate of the audio. Based on this, in this embodiment, the first value, the second value, and the third value may be preset percentages of the initial bit rate of the audio. In this implementation, the first device can determine the encoding bit rate based on the initial bit rate of the audio, to better balance the power consumption and the listening sense of the user.

According to a second aspect, this application provides an audio transmission method. The method includes: A second device determines noise energy data and transmission efficiency data, where the noise energy data is used to indicate noise energy or noise loudness, and the transmission efficiency data is used to indicate quality of a wireless channel between the second device and a first device. The second device sends the noise energy data and the transmission efficiency data to the first device. The second device receives audio data from the first device. The second device decodes the audio data, and plays audio obtained by decoding.

In this application, there is a wireless connection relationship between the second device and the first device. After establishing the wireless connection relationship with the first device, the second device may receive the audio data from the first device. Further, the second device may determine the noise energy data of the second device and the transmission efficiency data of receiving the audio data by the second device. Then, the second device sends both the noise energy data and the transmission efficiency data to the first device, so that the first device determines one bit rate based on each of noise and the quality of the wireless channel, and then selects a lower bit rate as an encoding bit rate. In this way, not only power consumption for audio encoding/decoding and audio transmission can be reduced, but also power consumption and a listening sense of a user can be balanced.

In a possible design, that a second device determines noise energy data includes: The second device collects a noise sound wave. The second device performs sampling on the noise sound wave to obtain a digital signal of the noise. The second device selects k consecutive sample points in the digital signal, where k is an integer greater than or equal to 1. The second device computes energy data corresponding to each sample point of the k sample points to obtain k pieces of energy data. The second device uses smallest energy data of the k pieces of energy data as the noise energy data. In this implementation, the second device can determine energy or loudness of noise perceived by the user, and further provide data reference for determining an encoding bit rate of audio.

In a possible design, the second device performs sampling on the noise sound wave to obtain a digital signal $x(n)$ of the noise, where $x(n)$ is greater than −1 and less than 1, and n is an integer greater than or equal to 1; and the second device determines the noise energy data $1(n)$ according to $1(n)=\min(x^2(n), x^2(n-1), \ldots x^2(n-k))$. The second device may collect the noise sound wave by using a microphone of the second device. In some embodiments, loudness of noise received by the microphone of the second device is the same as loudness of noise actually perceived by the user. Based on this, in this embodiment, the second device may accurately determine, according to the foregoing algorithm, the energy or loudness of the noise actually perceived by the user, and then can provide the data reference for determining the encoding bit rate of the audio.

In a possible design, the second device performs sampling on the noise sound wave to obtain a digital signal $x'(n)$ of the noise, where $x'(n)$ is greater than $x(n)$, and $x'(n)$ is greater than −1 and less than 1; the second device converts $x'(n)$ into $x(n)$ according to $x(n)=\alpha 1 \times x'(n)$, where $\alpha 1$ is greater than 0 and less than 1; and the second device determines the noise energy data $1(n)$ according to $1(n)=\min(x^2(n), x^2(n-1), \ldots x^2(n-k))$. In some embodiments, the loudness of the noise received by the microphone of the second device is higher than the loudness of the noise actually perceived by the user. Based on this, in this embodiment, the second device may accurately determine, according to the foregoing algorithm, the energy or loudness of the noise actually perceived by the user, and then can provide the data reference for determining the encoding bit rate of the audio.

In a possible design, the second device performs sampling on the noise sound wave to obtain a digital signal $x'(n)$ of the noise, where $x'(n)$ is greater than $x(n)$, and $x'(n)$ is greater than −1 and less than 1; the second device determines initial energy data $1'(n)$ according to $1'(n)=\min(x'^2(n), x'^2(n-1), \ldots x'^2(n-k))$; and the second device converts the initial energy data $1'(n)$ into the noise energy data $1(n)$ according to $1(n)=\alpha 2 \times 1'(n)$, where $\alpha 2$ is greater than 0 and less than 1. In some embodiments, the loudness of the noise received by the microphone of the second device is higher than the loudness of the noise actually perceived by the user. Based on this, in this embodiment, the second device may accurately determine, according to the foregoing algorithm, the energy or loudness of the noise actually perceived by the user, and then can provide the data reference for determining the encoding bit rate of the audio.

According to a third aspect, this application provides an electronic device. The electronic device has a function for implementing the method in the first aspect. The function may be implemented by hardware, or may be implemented by hardware by executing corresponding software. The hardware or the software includes one or more modules corresponding to the foregoing function. In a possible design, a structure of the electronic device includes a processor and a transceiver. The processor is configured to enable the electronic device to perform a corresponding function in the foregoing method. The transceiver is configured to implement data receiving and sending. The electronic device may further include a memory. The memory is configured to be coupled to the processor, and the memory stores program instructions and data that are necessary for the electronic device.

According to a fourth aspect, this application provides an electronic device. The electronic device has a function for implementing the method in the second aspect. The function may be implemented by hardware, or may be implemented by hardware by executing corresponding software. The hardware or the software includes one or more modules corresponding to the foregoing function. In a possible design, a structure of the electronic device includes a processor and a transceiver. The processor is configured to enable the electronic device to perform a corresponding function in the foregoing method. The transceiver is configured to implement data receiving and sending. The electronic device may further include a memory. The memory is configured to be coupled to the processor, and the memory stores program instructions and data that are necessary for the electronic device.

According to a fifth aspect, this application further provides a chip system. The chip system is disposed in the electronic equipment in the third aspect and includes at least one processor and an interface. The interface is coupled to the processor and is configured to receive code instructions and transmit the code instructions to the at least one processor. The at least one processor runs the code instructions, and implements some or all steps of the audio transmission methods in the first aspect and various possible implementations of the first aspect.

According to a sixth aspect, this application further provides a chip system. The chip system is disposed in the electronic equipment in the fourth aspect and includes at least one processor and an interface. The interface is coupled to the processor and is configured to receive code instructions and transmit the code instructions to the at least one processor. The at least one processor runs the code instructions, and implements some or all steps of the audio transmission methods in the second aspect and various possible implementations of the second aspect.

According to a seventh aspect, this application provides a computer storage medium. The computer storage medium stores instructions. When the instructions are run on a computer, the computer is enabled to perform some or all steps of the audio transmission methods in the first aspect, the second aspect, various possible implementations of the first aspect, and various possible implementations of the second aspect.

According to an eighth aspect, this application provides a computer program product. When the computer program product runs on a computer, the computer is enabled to perform some or all steps of the audio transmission methods in the first aspect, the second aspect, various possible implementations of the first aspect, and various possible implementations of the second aspect.

DESCRIPTION OF EMBODIMENTS

The following clearly describes technical solutions in this application with reference to accompanying drawings in this application.

Terms used in the following embodiments of this application are only intended to describe particular embodiments, and are not intended to limit this application. Terms "one", "a", "the", "the foregoing", "this", and "the one" of singular forms used in this specification and the appended claims of this application are also intended to include plural forms, unless otherwise specified in the context clearly. It should also be understood that although terms such as first and second may be used to describe a class of objects in the following embodiments, the objects should not be limited to these terms. The terms are merely used to distinguish between specific objects of this class of objects. For example, in the following embodiments, the terms such as first and second may be used to describe a bit rate, but the bit rate should not be limited to these terms. These terms are merely used to distinguish between different bit rates. The same applies to other classes of objects that may be described by using the terms such as first and second in the following embodiments, and details are not described herein again.

The following describes an implementation scenario of this application.

Figure 1:
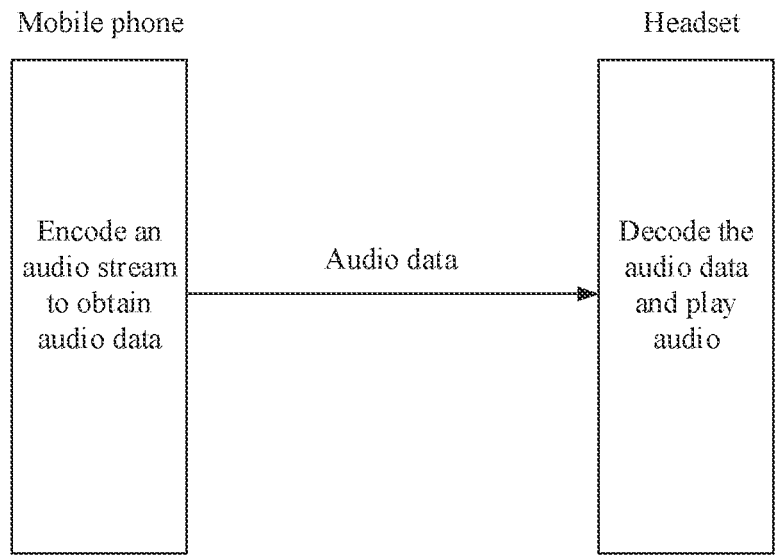
FIG. 1 is a schematic diagram of a typical audio transmission scenario according to this application.
Figure 2:
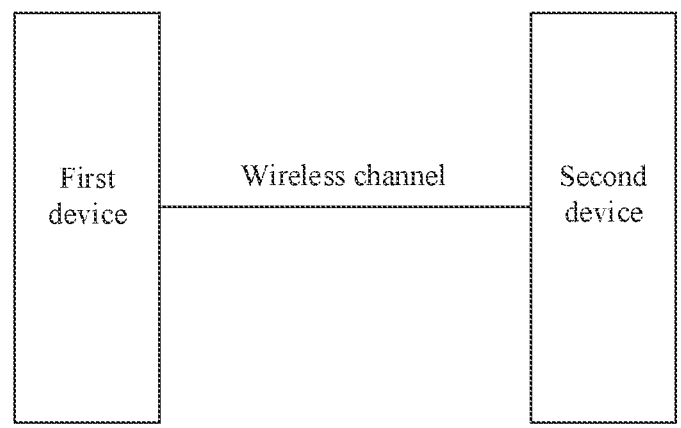
FIG. 2 is a schematic diagram of an example of an audio transmission scenario according to this application.

As shown in FIG. 2, this application relates to a first device and a second device. The first device and the second device are connected to each other through a wireless channel. The first device may be configured to perform encoding to obtain audio data, and then sends the audio data to the second device through the wireless channel. The second device may be configured to decode the audio data, and then plays decoded audio.

The first device in this application may be an electronic device having an audio encoding function, for example, a mobile phone, a tablet computer, a smart television, a vehicle-mounted device, or a wearable electronic device (for example, a smart band) having an audio encoding function and a wireless communication function. For example, the first device may be an electronic device including but not limited to an electronic device, a vehicle-mounted device, or the like equipped with an iOS®, Android®, Microsoft®, or another operating system.

The second device in this application may be an electronic device having an audio play function, for example, an electronic device such as a wireless headset, a wireless speaker, a smart television, a tablet computer, a music play device (for example, an MP3 player or an MP4 player), or a vehicle-mounted device.

A connection manner between the first device and the second device in this application may include a wireless fidelity (wireless fidelity, Wi-Fi) connection, a Bluetooth connection, and the like.

Audio encoding in this application is a process for sampling, quantizing, and encoding a waveform signal (namely, an analog audio signal) of audio, and converting the waveform signal into a digital audio signal. Correspondingly, audio decoding in this application is a process for restoring the digital audio signal to the analog audio signal. In embodiments of this application, a "sound source", an "audio stream", or "input audio" is the analog audio signal, and the "audio data" in embodiments of this application is the digital audio signal obtained through encoding. Embodiments of this application may support a plurality of audio encoding and decoding formats, such as pulse code modulation (pulse code modulation, PCM), Waveform Audio File Format (WAV), MP3, WMA (windows media audio), advanced audio coding (advanced audio coding. AAC), and MPEG-4. A format supported by the first device for encoding is the same as a format supported by the second device for decoding.

Noise in this application may also be referred to as ambient noise, and is a sound other than audio corresponding to the audio data that is received by the second device from the first device. For example, the noise may include a sound generated when a vehicle is running, a sound generated in a public place, an entertainment place, or the like, and a sound generated by a home appliance such as a television set or a washing machine. In embodiments of this application, noise energy data may be used to represent energy of the noise or loudness of the noise.

With reference to FIG. 2, in an existing implementation, when determining an encoding bit rate of the audio, the first device usually uses quality of wireless communication as a reference without considering impact of the noise, so that a determined bit rate is relatively high. However, noise usually exists in an actual use environment of a user. Based on this, even if the audio data is obtained by encoding at a relatively high bit rate, listening experience of the user cannot be improved. Consequently, computational complexity of encoding and decoding the audio is relatively high, and power consumption in an encoding and decoding process of a device is relatively high.

This application provides an audio transmission method and an electronic device. The second device may send noise of the second device end to the first device, and the first device uses the noise as one of reference factors when determining the encoding bit rate. In this way, a relatively low encoding bit rate can be determined, computational complexity and power consumption of encoding and decoding can be reduced, and the listening experience of the user can be kept unchanged.

Figure 3A:
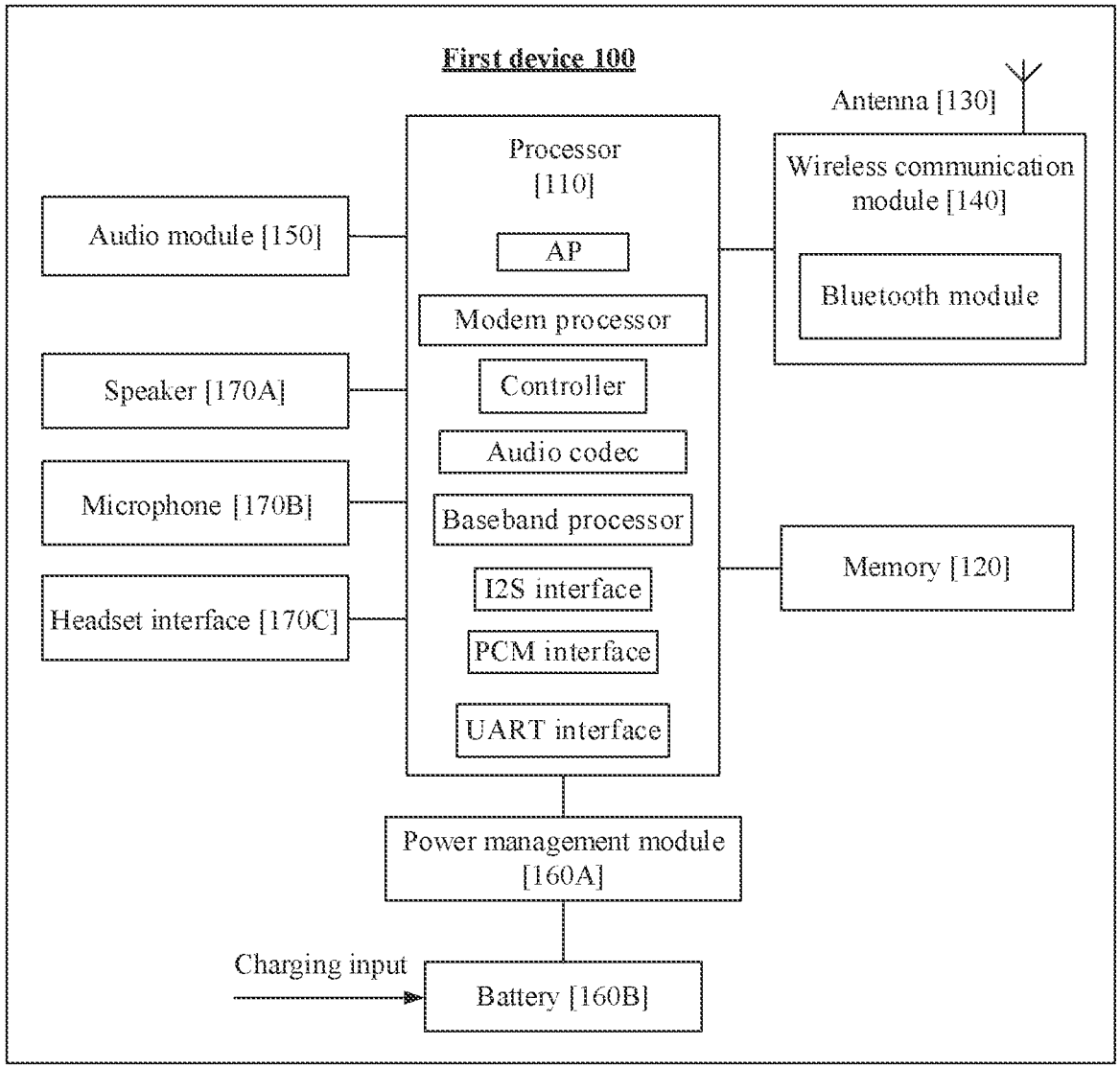
FIG. 3A is a schematic diagram of an example of an architecture of a first device 100 according to this application.

According to an embodiment of this application, FIG. 3A is a schematic diagram of a structure of a first device 100.

The first device 100 may include a processor 110, a memory 120, an antenna 130, a wireless communication module 140, an audio module 150, a power management module 160A, a battery 160B, a speaker 170A, a microphone 170B, a headset interface 170C, and the like. The wireless communication module 140 may include a Bluetooth (Bluetooth, BT) module, a wireless fidelity (wireless fidelity, Wi-Fi) module, a near field communication (near field communication, NFC) module, and the like.

It may be understood that the structure shown in this application does not constitute a specific limitation on the first device 100. In some other embodiments of this application, the first device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a controller, an audio codec, a baseband processor, and the like. Different processing units may be independent components, or may be integrated into one or more processors. In some embodiments, the first device 100 may alternatively include one or more processors 110.

The controller may be a nerve center and a command center of the first device 100. The controller may generate an operation control signal based on instruction operation code and a time sequence signal, to complete control of determining a target bit rate and the like.

The modem processor may include a modulator and a demodulator. The modulator is configured to modulate a to-be-sent low-frequency baseband signal into a medium-/high-frequency signal. The demodulator is configured to demodulate a received electromagnetic wave signal into a low-frequency baseband signal. Then the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (not limited to the speaker 170A). In some embodiments, the modem processor may be an independent component. In some other embodiments, the modem processor may be independent of the processor 110, and is disposed in the same component as another function module.

The audio codec is configured to compress (namely, encode) or decompress (namely, decode) digital audio. For example, to-be-transmitted audio is encoded based on the target bit rate. The first device 100 may support one or more audio codecs. In this way, the first device 100 may play or record audio in a plurality of encoding formats, such as PCM, WAV, MP3, WMA, AAC and MPEG-4.

In some embodiments, the processor 110 may include one or more interfaces. The interface may include an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, and the like.

The I2S interface may be configured to perform audio communication. In some embodiments, the processor 110 may include a plurality of groups of I2S buses. The processor 110 may be coupled to the audio module 150 through the I2S bus, to implement communication between the processor 110 and the audio module 150. In some embodiments, the audio module 150 may transmit an audio signal to the wireless communication module 140 through the I2S interface, to implement a function of answering a call by using a Bluetooth headset.

The PCM interface may be also configured to perform audio communication, and sample, quantize, and encode an analog signal. In some embodiments, the audio module 150 may be coupled to the wireless communication module 140 through a PCM bus interface. In some embodiments, the audio module 150 may alternatively transmit the audio signal to the wireless communication module 140 through the PCM interface, to implement the function of answering a call by using the Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 140. For example, the processor 110 communicates with the Bluetooth module in the wireless communication module 140 through the UART interface, to implement a Bluetooth function. In some embodiments, the audio module 150 may transmit the audio signal to the wireless communication module 140 through the UART interface, to implement a function of playing music by using a Bluetooth play device (for example, the Bluetooth headset).

It may be understood that an interface connection relationship between modules shown in this application is merely an example for description, and does not constitute a limitation on the structure of the first device 100. In some other embodiments, the first device 100 may alternatively use an interface connection manner different from that in the foregoing embodiment, or a combination of a plurality of interface connection manners.

The memory 120 may be configured to store one or more computer programs, and the one or more computer programs include instructions. The processor 110 may run the foregoing instructions stored in the memory 120, so that the first device 100 performs the audio transmission method, data processing, and the like provided in some embodiments of this application. The memory 120 may include a program storage area and a data storage area. The program storage area may store an operating system, and the program storage area may further store one or more application programs (such as a music player), and the like. The data storage area may store data (such as the target bit rate and the audio data) used in a process in which the first device 100 performs embodiments of this application. The memory 120 may include a high-speed random access memory, and may further include a non-volatile memory, for example, at least one magnetic disk storage component, a flash memory component, or a universal flash storage (universal flash storage, UFS).

The wireless communication module 140 may provide a solution that is applied to the first device 100 and that includes communication such as a wireless local area network (wireless local area network, WLAN) (for example, a wireless fidelity (wireless fidelity, Wi-Fi) network), Bluetooth, a global navigation satellite system (global navigation satellite system, GNSS), frequency modulation (frequency modulation, FM), near field communication (near field communication, NFC), an infrared (infrared, IR) technology, and an optical fiber. The wireless communication module 140 may be one or more components integrating at least one communication processing module. The wireless communication module 140 receives an electromagnetic wave through the antenna 130, performs frequency modulation and filtering processing on an electromagnetic wave signal, and sends a processed signal to the processor 110. The wireless communication module 140 may further receive a to-be-sent signal from the processor 110, perform frequency modulation and amplification on the signal, and convert a processed signal into an electromagnetic wave for radiation through the antenna 130.

In some embodiments, a communication solution provided by the wireless communication module 140 may enable the first device 100 to communicate with a second device 200, so that the first device 100 can perform audio transmission with the second device 200.

The first device 100 may implement an audio function, for example, music playing or recording, by using the audio module 150, the speaker 170A, the microphone 170B, the headset interface 170C, the application processor, and the like.

The audio module 150 is configured to convert digital audio information into an analog audio signal for output, and is also configured to convert an analog audio input into a digital audio signal. The audio module 150 may be further configured to encode and decode an audio signal. In some embodiments, the audio module 150 may be disposed in the processor 110, or some function modules of the audio module 150 are disposed in the processor 110.

The speaker 170A, also referred to as a "loudspeaker", is configured to convert an audio electrical signal into a sound signal. The first device 100 may be used to listen to music over the speaker 170A.

The microphone 170B, also referred to as a "mic" or a "mike", is configured to convert a sound signal into an electrical signal. When recording, making a call, or sending voice information, the user may place a sound source close to the microphone 170B, and input the sound signal to the microphone 170B. The first device 100 may be provided with at least one microphone 170B. In some other embodiments, the first device 100 may be provided with two microphones 170B, to collect the sound signal and further implement a noise reduction function. In some other embodiments, the first device 100 may be alternatively provided with three, four, or more microphones 170B, to collect the sound signal, reduce noise, identify the sound source, implement a directional recording function, and the like.

The headset interface 170C is configured to connect to a wired headset. The headset interface 170C may be a 3.5 mm open mobile terminal platform (open mobile terminal platform, OMTP) standard interface or a cellular telecommunications industry association of the USA (cellular telecommunications industry association of the USA, CTIA) standard interface.

The power management module 160A is configured to connect to the battery 160B. The power management module 160A receives input from the battery 160B, and supplies power to the processor 110, the memory 120, the wireless communication module 140, and the like. The power management module 160A may be further configured to monitor parameters such as a battery capacity, a battery cycle count, and a battery health status (electric leakage or impedance). In some other embodiments, the power management module 160A may be alternatively disposed in the processor 110. In some other embodiments, the power management module 160A may be alternatively disposed in a same component.

For example, the first device 100 shown in FIG. 3A may determine the target bit rate by using the processor 110. The first device 100 may encode the to-be-transmitted audio by using the audio codec. The first device 100 may send the audio data to the second device 200 by using the wireless communication module 140, and the like.

Figure 3B:
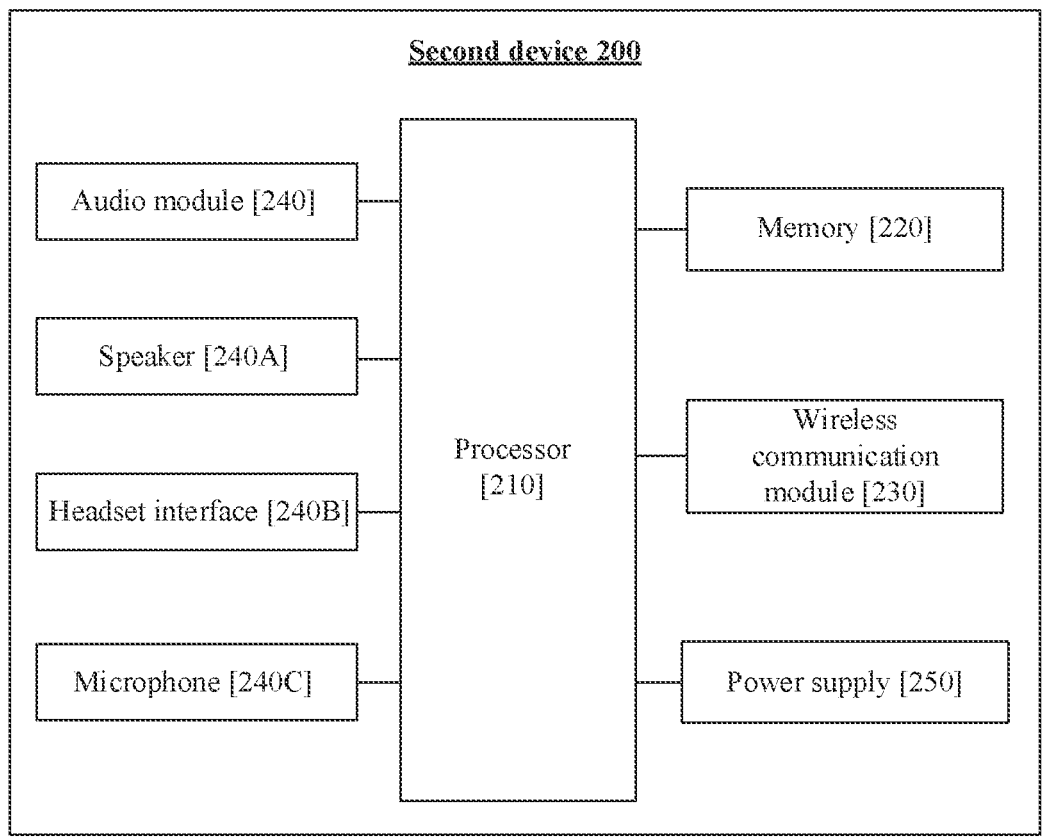
FIG. 3B is a schematic diagram of an example of an architecture of a second device 200 according to this application.

FIG. 3B is a schematic diagram of an example of an architecture of the second device 200.

The second device 200 may include a processor 210, a memory 220, a wireless communication module 230, an audio module 240, a speaker 240A, a headset interface 240B, a microphone 240C, a power supply 250, and the like.

It may be understood that the structure shown in this application does not constitute a specific limitation on the second device 200. In some other embodiments of this application, the second device 200 may include more or fewer components than those shown in the figure, or some components may be combined, or some components may be split, or there may be a different component layout. The components shown in the figure may be implemented by hardware, software, or a combination of software and hardware.

In this embodiment, hardware and software included in the processor 210 and functions of the hardware and software are similar to those of the processor 110, for example, an audio codec included in the processor 210. Details are not described herein again in this application. The processor 210 may be configured to invoke the microphone 240C to obtain a noise signal, and then compute noise energy data. The processor 210 may be further configured to collect statistics about the transmission efficiency data of the received audio data, so that the first device 100 determines the quality of wireless communication based on the transmission efficiency data. The transmission efficiency data may include at least one of the following: a packet loss rate, a transmission delay, a retransmission rate, and the like. The processor 210 may be further configured to invoke the speaker 240A or the headset interface 240B to play audio.

The memory 220 may be configured to store one or more computer programs, and the one or more computer programs include instructions. The processor 210 may run the foregoing instructions stored in the memory 220, so that the second device 200 performs the audio transmission method, and the like provided in some embodiments of this application. For example, the memory 220 may be configured to buffer the audio data received by the second device 200 from the first device 100, a collected noise signal, and the like.

A communication solution provided by the wireless communication module 230 is similar to that provided by the wireless communication module 140, and details are not described herein again. The communication solution provided by the wireless communication module 230 may enable the second device 200 to communicate with the first device 100, so that the second device 200 can perform data transmission with the first device 100.

A function of the audio module 240 is similar to that of the audio module 150, and details are not described herein again.

A function of the speaker 240A is similar to that of the speaker 170A, and details are not described herein again. In this embodiment, the speaker 240A may be configured to convert an audio electrical signal obtained by the audio codec through decoding into a sound signal. A function of the headset interface 240B is similar to that of the headset interface 170C, and details are not described herein again.

A function of the microphone 240C is similar to that of the microphone 170B, and details are not described herein again. In this embodiment, the microphone 240C may be configured to collect a sound wave of noise, and then transmit the collected sound wave of the noise to the processor 210. In some embodiments, the microphone 240C may be a component of the second device 200. In some other embodiments, the microphone 240C may be an external device independent of another component of the second device 200.

The power supply 250 may be configured to supply power to the processor 210, the memory 220, the microphone 240C, and the like.

For example, the second device 200 shown in FIG. 3B may obtain the noise signal by using the microphone 240C. The second device 200 may send the noise energy data to the first device 100 by using the wireless communication module 230. The second device 200 may play the audio by using the speaker 240A or the headset interface 240B, and the like.

The following describes an audio transmission method in this application by using examples with reference to the first device 100 and the second device 200.

Figure 4:
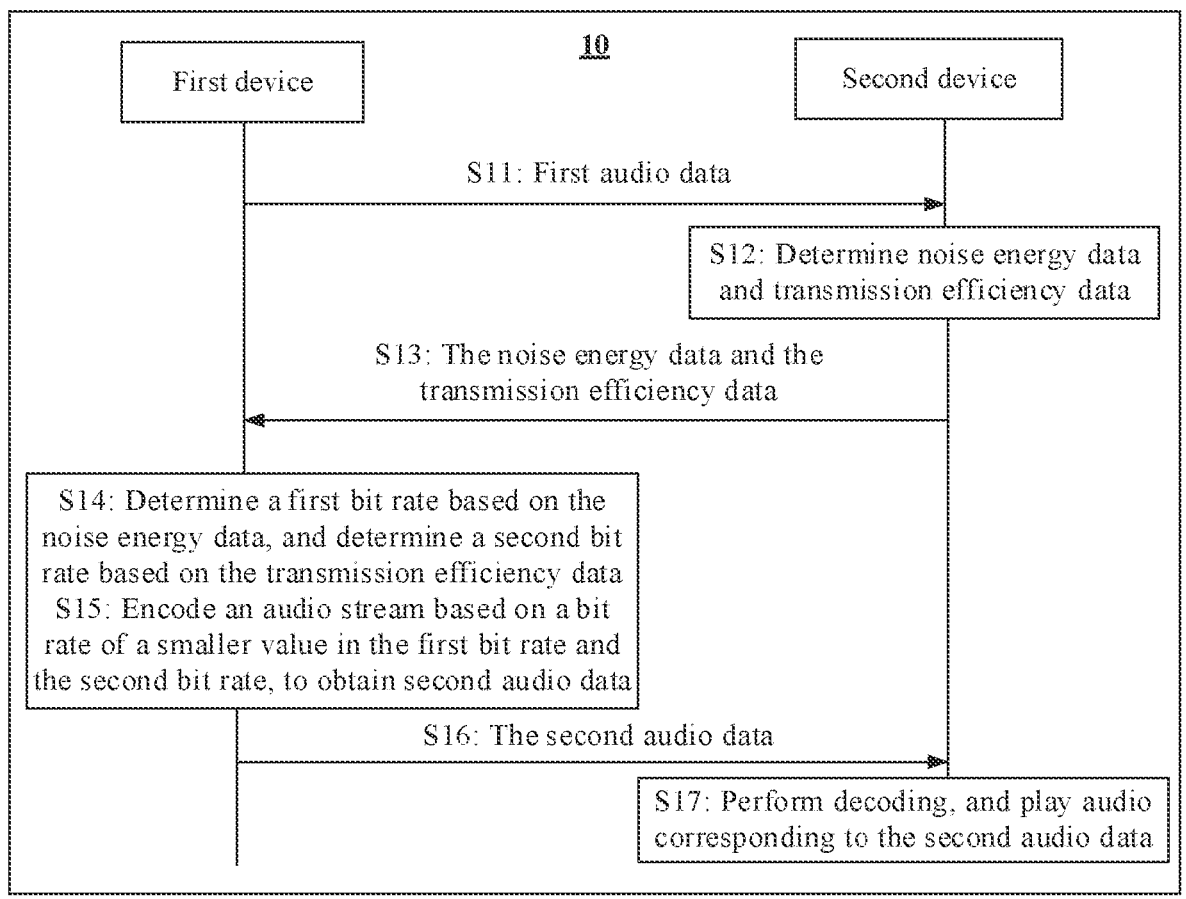
FIG. 4 is a diagram of an example of signaling interaction of an audio transmission method 10 according to this application.

FIG. 4 is a diagram of signaling interaction of an audio transmission method 10. The audio transmission method 10 (briefly referred to as method 10 in the following) relates to a first device and a second device. The first device and the second device have a wireless connection relationship, and the wireless connection relationship is, for example, a Bluetooth connection relationship. For example, the first device may be implemented as the first device 100. For example, the second device may be implemented as the second device 200. The method 10 includes the following steps.

Step S11: The first device sends first audio data to the second device.

After establishing the wireless connection to the second device, the first device may encode an audio stream at a random encoding bit rate, to obtain the first audio data. Then, the first device sends the first audio data to the second device by using the wireless connection to the second device.

Step S12: The second device determines noise energy data and transmission efficiency data.

The noise energy data is used to indicate energy or loudness of noise actually perceived by a user, and the noise energy data may be measured by, for example, decibel (decibel, dB). Larger noise energy data indicates higher energy of the noise or higher loudness of the noise. Smaller noise energy data indicates lower energy of the noise or lower loudness of the noise. The transmission efficiency data is used to indicate quality of a wireless channel between the second device and the first device. The transmission efficiency data may include at least one of the following: a packet loss rate, a transmission delay, a retransmission rate, and the like. For example, after receiving the first audio data, the second device may determine the transmission efficiency data of the first audio data. In some embodiments, the second device may respectively determine the noise energy data and the transmission efficiency data by using two threads.

For example, the second device may collect a noise sound wave by using a microphone of the second device, and then sample and quantize the collected noise sound wave, to obtain a digital signal of noise. Then, the second device selects k consecutive sample points in the digital signal, and computes energy data corresponding to each sample point of the k sample points. Then, the second device may use smallest energy data as the noise energy data. Herein, k is an integer greater than or equal to 1.

It may be understood that, in an actual operation, the noise occurs relatively randomly. In some scenarios, the second device may collect occasional short-time noise with high loudness. Based on this, if largest energy data in energy data of the k sample points is used as the noise energy data, or an average value of the energy data of the k sample points is used as the noise energy data, the obtained noise energy data may be inaccurate. Based on this, in a possible implementation of this application, the second device uses the smallest energy data as the noise energy data.

It should be noted that, when implementation forms of the second device are different, implementation forms of the microphone on the second device are also different. Correspondingly, in some scenarios, loudness of noise received by the microphone is the same as the loudness of the noise actually perceived by the user. For example, loudness of noise received by an in-ear microphone of a wireless headset is the same as the loudness of the noise actually perceived by the user. For another example, loudness of noise received by a peripheral microphone of a wireless speaker is the same as the loudness of the noise actually perceived by the user. In some other embodiments, the loudness of the noise received by the microphone is different from the loudness of the noise actually perceived by the user. For example, loudness of noise received by an external microphone of a wireless headset is higher than the loudness of the noise actually perceived by the user. Based on this, in different scenarios, the second device determines the noise energy data in different manners.

Scenario 1: The loudness of the noise received by the microphone is the same as the loudness of the noise actually perceived by the user.

After collecting the noise sound wave by using the microphone, the second device samples and quantizes the noise sound wave to obtain a data signal x(n) of the noise, where $1>x(n)>-1$, and n is an integer greater than or equal to 1. Further, the second device determines the noise energy data $1(n)$, where $1(n)=\min(x^2(n), x^2(n-1), \ldots x^2(n-k))$, where k is a window length used to select a sample point, and a value of k is as described above, and is not described herein again.

Scenario 2: The loudness of the noise received by the microphone is higher than the loudness of the noise actually perceived by the user.

Manner 1: After collecting the noise sound wave by using the microphone, the second device samples and quantizes the noise sound wave to obtain a data signal x'(n) of the noise, where $1>x'^{(n)}>-1$, and n is an integer greater than or equal to 1. Then, the second device converts x'(n) into x(n), where $x(n)=\alpha 1 \times x'(n)$, and $\alpha 1$ is greater than 0 and less than 1.

Manner 2: After collecting the noise sound wave by using the microphone, the second device samples and quantizes the noise sound wave to obtain a data signal x'(n) of the noise, where $1>x'(n)>-1$, and n is an integer greater than or equal to 1. Then, the second device determines initial energy data $1'(n)$ according to x'(n), where $1'(n)=\min(x'^2(n), x'^2(n-1), \ldots x'^2(n-k))$. Then, the second device converts $1'(n)$ into $1(n)$, where $1(n)=\alpha 2 \times 1'(n)$, and $\alpha 2$ is greater than 0 and less than 1.

It may be understood that the foregoing process for determining the noise energy data is merely an example for description, and constitutes no limitation on this embodiment of this application. In some other embodiments of this application, the second device may determine the noise energy data in another manner based on different microphone settings and different use scenarios. Details are not described herein again.

Step S13: The second device sends the noise energy data and the transmission efficiency data to the first device.

The second device may send the noise energy data and the transmission efficiency data to the first device through the wireless channel between the second device and the first device.

For example, the operation of sending the noise energy data to the first device and the operation of sending the transmission efficiency data by the second device may be simultaneously performed or may not be simultaneously performed. This is not limited herein.

Step S14: The first device determines a first bit rate based on the noise energy data, and determines a second bit rate based on the transmission efficiency data.

Both the first bit rate and the second bit rate are encoding bit rates of audio, and may be measured by, for example, kilobits per second (kbps). An encoding bit rate indicates a quantity of bytes in each audio data packet.

With reference to the description of the noise energy data in step S12, further, after the noise energy data is received, if it is determined that the noise energy data is less than a first threshold, the first device determines that the first bit rate is a first value. If it is determined that the noise energy data is greater than the first threshold and less than a second threshold, the first device determines that the first bit rate is a second value. If it is determined that the noise energy data is greater than the second threshold, the first device determines that the first bit rate is a third value. The first threshold is less than the second threshold. For example, the first threshold is −80 dB, and the second threshold is −20 dB. The first value is greater than the second value, and the second value is greater than the third value.

In some embodiments, the user has no requirement on sound quality of the audio. Correspondingly, the first device may adaptively adjust an encoding bit rate of output audio. Based on this, in this embodiment, the first value, the second value, and the third value may be preset fixed values. For example, the first value is 960 kbps, the second value is 256 kbps, and the third value is 96 kbps. In this implementation, computational complexity and power consumption of encoding and decoding can be reduced, and listening experience of the user can be kept unchanged.

In some other embodiments, the user may have a specific requirement on the sound quality of the audio. For example, the user may select high-quality music, and the like, and initial bit rates of audio of different sound qualities are different. Correspondingly, the first device may determine an encoding bit rate of the audio based on an initial bit rate of the audio. Based on this, in this embodiment, the first value, the second value, and the third value may be preset percentages of the initial bit rate of the audio. For example, the first value is 95% of the initial bit rate, the second value is 40% of the initial bit rate, and the third value is 10% of the initial bit rate. In this implementation, the first device can determine the encoding bit rate based on the initial bit rate of the audio, to better balance the power consumption and a listening sense of the user.

It may be understood that the foregoing process for determining the first bit rate based on the noise energy data is merely an example for description, and constitutes no limitation on this embodiment of this application. In some other embodiments of this application, the first device may determine the first bit rate based on another condition. In addition, specific values of the first threshold, the second threshold, the first value, the second value, and the third value may be other values, and a determining manner may be another manner. This is not limited herein.

On another aspect, after receiving the transmission efficiency data of the audio data, the first device may determine quality of wireless communication based on the transmission efficiency data, and then determine the second bit rate based on the quality of wireless communication. A transmission delay of the first audio data is used as an example. If the transmission delay is less than a third threshold, it indicates that the quality of wireless communication is good, and the first device may determine that the second bit rate is a larger value. If the transmission delay is greater than the third threshold, it indicates that the quality of wireless communication is poor, and the first device may determine that the second bit rate is a smaller value. The third threshold is, for example, 2 milliseconds (ms). Details are not described herein again.

Step S15: The first device encodes the audio stream based on a lower bit rate of the first bit rate and the second bit rate, to obtain second audio data.

The first device may support a plurality of encoding formats, such as, PCM, WAV, MP3. WMA. AAC, and MPEG-4. The first device may perform encoding by using any encoding format supported by the first device. Details are not described herein again.

Step S16: The first device sends the second audio data to the second device.

The first device may send the second audio data to the second device through the wireless channel between the first device and the second device.

Step S17: The second device decodes the second audio data, and plays audio corresponding to the second audio data.

A decoding format for the second audio data of the second device may be the same as an encoding format of the first device. For example, the first device performs encoding by using AAC, and in this step, the second device may also perform decoding by using the AAC.

In conclusion, according to the audio transmission method in this embodiment of this application, the second device sends, to the first device, both noise that is collected from the second device end and transmission efficiency information that reflects the quality of the wireless channel. Further, the first device determines one bit rate based on each of the noise and the quality of the wireless channel, and then selects a lower bit rate as the encoding bit rate. In this way, not only power consumption for audio encoding/decoding and audio transmission can be reduced, but also the power consumption and the listening sense of the user can be balanced.

The following describes an audio transmission method in an embodiment of this application with reference to an instance.

For example, the first device 100 is a mobile phone, and the second device 200 is a wireless headset. The mobile phone establishes a Bluetooth connection to the wireless headset. The wireless headset includes an in-ear microphone and an external microphone.

Figure 5:
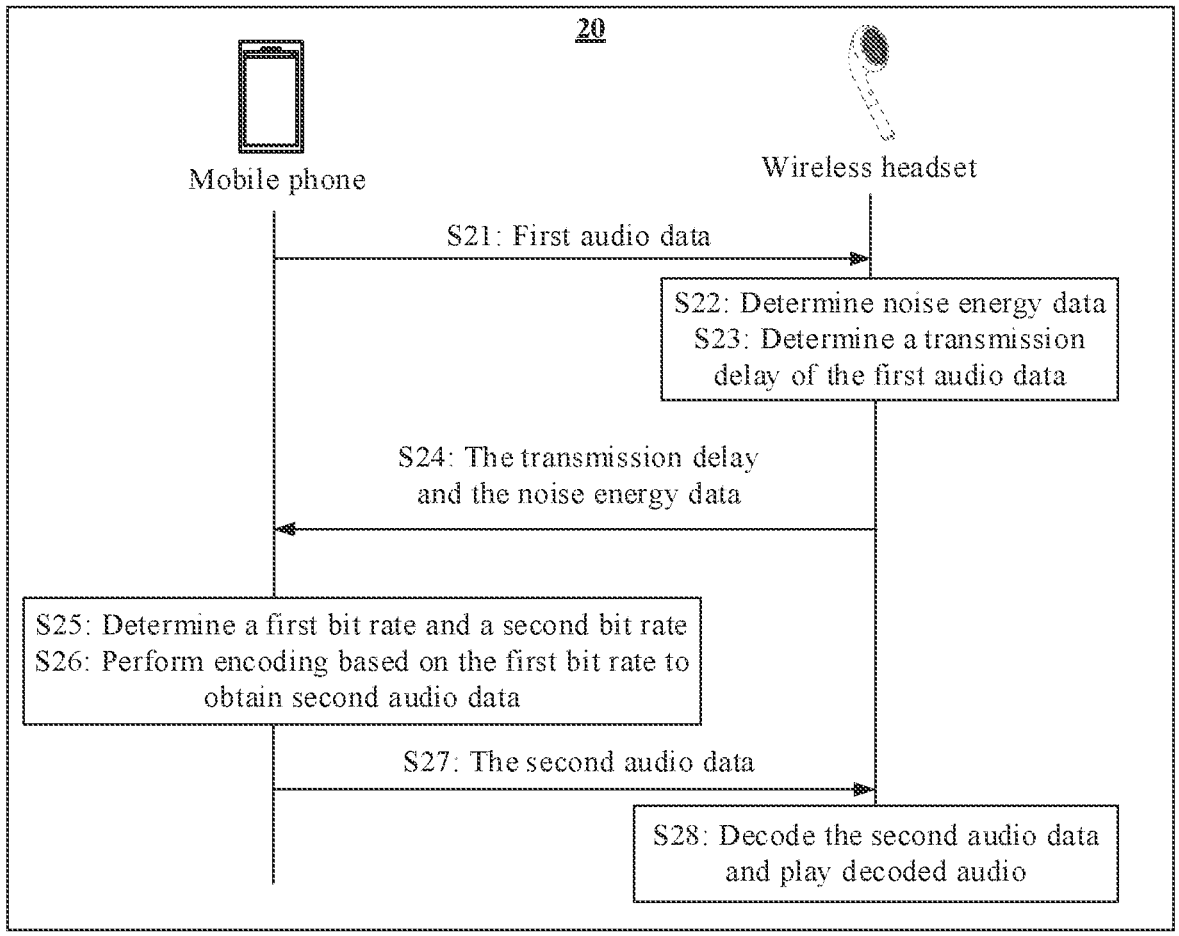
FIG. 5 is a diagram of an example of signaling interaction of an audio transmission method 20 according to this application.

FIG. 5 is a diagram of signaling interaction of an audio transmission method 20. The audio transmission method 20 (briefly referred to as 20 in the following) includes the following steps.

Step S21: The mobile phone sends first audio data to the wireless headset.

The first audio data is the $1^{st}$ audio data sent by the mobile phone to the wireless headset after the mobile phone establishes the Bluetooth connection to the wireless headset.

In actual implementation, after establishing the Bluetooth connection to the wireless headset, the mobile phone may encode an audio stream at a random encoding bit rate, to obtain the first audio data. Then, the mobile phone sends the first audio data to the wireless headset by using the Bluetooth connection.

Step S22: The wireless headset determines noise energy data based on noise collected by the in-ear microphone.

For example, after receiving a noise sound wave collected by the in-ear microphone, the wireless headset converts the noise sound wave into a data signal $x(n)$, and then determines the noise energy data $1(n)$ according to $1(n)=\min(x^2(n), x^2(n-1), \ldots x^2(n-k))$. The noise energy data $1(n)$ is, for example, −50 dB.

It should be noted that, in some other embodiments, the wireless headset may alternatively determine the noise energy data $1(n)$ based on noise collected by the external microphone. Because loudness of the noise collected by the external microphone is higher than loudness of noise heard by a user, in a possible implementation, after converting a noise sound wave collected by the external microphone into a data signal $x'(n)$, the wireless headset may convert, for example, $x'(n)$ into $x(n)$ according to an algorithm $x(n)=\alpha 1 \times x'(n)$, and then determine the noise energy data $1(n)$ according to $1(n)=\min(x^2(n), x^2(n-1), \ldots x^2(n-k))$.

Step S23: The wireless headset determines a transmission delay of the first audio data.

The transmission delay is, for example, 1.5 ms.

After step S21, the wireless headset may further decode the first audio data, and then play audio corresponding to the first audio data.

It should be noted that execution of step S22 and step S23 is not limited by the description in this embodiment. In some other embodiments, the wireless headset may simultaneously perform step S22 and step S23. In some other embodiments, the wireless headset may first perform step S23 simultaneously, and then perform step S22.

Step S24: The wireless headset sends the transmission delay and the noise energy data to the mobile phone.

With reference to descriptions of step S22 and step S23, the wireless headset may simultaneously send the transmission delay and the noise energy data, or may not simultaneously send the transmission delay and the noise energy data. This is not limited in this application.

Step S25: The mobile phone determines a first bit rate based on the noise energy data, and determines a second bit rate based on the transmission delay.

When the noise energy data is −50 dB, the noise energy data is greater than −80 dB and less than −20 dB. Based on this, the mobile phone may determine that the first bit rate is 256 kbps.

In addition, that the transmission delay is less than 2 ms indicates that Bluetooth signal quality is good. For example, the mobile phone may determine that the second bit rate is 480 kbps.

Step S26: The mobile phone encodes the audio stream based on the first bit rate, to obtain second audio data.

The first bit rate 256 kbps is less than the second bit rate 480 kbps, and the mobile phone encodes the audio stream based on the first bit rate.

Step S27: The mobile phone sends the second audio data to the wireless headset.

Step S28: The wireless headset decodes the second audio data and plays decoded audio.

The mobile phone and the wireless headset cyclically perform corresponding steps in step S22 to step S28 until the mobile phone end stops audio transmission or the Bluetooth connection between the mobile phone and the wireless headset is disconnected.

It may be understood that FIG. 5 is merely an example for description, and constitutes no limitation on this embodiment of this application. In some other embodiments, the noise energy data, the first bit rate, the second bit rate, and the like in this application may be other values. In addition, this embodiment of this application may be further applicable to another similar implementation scenario. For example, in some other embodiments, the first device 100 may be a smart television, and the second device 200 may be a smart speaker. Details are not described herein again.

In conclusion, according to the audio transmission method shown in this embodiment of this application, the second device determines noise energy data on the second device end, determines transmission efficiency data of audio data, and then sends both the noise energy data and the transmission efficiency data to the first device. Further, the first device determines one bit rate based on each of the noise energy data and the transmission efficiency data, and then selects a lower bit rate as an encoding bit rate. In this way, not only power consumption for audio encoding/decoding and audio transmission can be reduced, but also the power consumption and a listening sense of the user can be balanced.

The foregoing embodiments describe the solutions of the audio transmission method provided in this application from perspectives of a hardware structure, a software architecture, and actions performed by software and hardware of an electronic device. A person skilled in the art should be easily aware that, with reference to the processing steps described in embodiments disclosed in this specification, such as noise energy data determining and transmission efficiency data determining, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

For example, the first device 100 may implement the foregoing corresponding functions in a form of function modules. In some embodiments, the first device 100 may include a processing module and a transceiver module. The transceiver module may be configured to perform data receiving and sending in any embodiment shown in FIG. 4 and FIG. 5. The processing module may be configured to perform an operation other than data receiving and sending in any embodiment shown in FIG. 4 and FIG. 5. For specific content, refer to related descriptions in the embodiments corresponding to FIG. 4 and FIG. 5. Details are not described herein again.

Figure 6A:
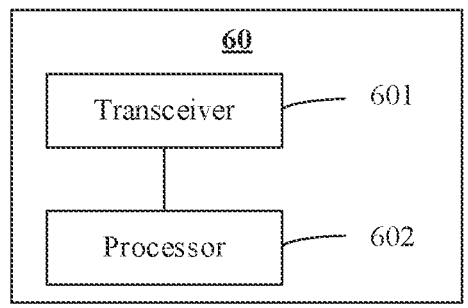
FIG. 6A is a schematic diagram of an example of a structure of an electronic device 60 according to this application.

It may be understood that division of the foregoing modules is merely logical function division. During actual implementation, a function of the transceiver module may be integrated into a transceiver for implementation, and a function of the processing module may be integrated into a processor for implementation. As shown in FIG. 6A, an electronic device 60 includes a transceiver 601 and a processor 602. The transceiver 601 may perform data receiving and sending in any embodiment shown in FIG. 4 and FIG. 5. The processor 602 may be configured to perform an operation other than data receiving and sending in any embodiment shown in FIG. 4 and FIG. 5.

For example, the transceiver 601 may be configured to receive noise energy data and transmission efficiency data from a second device. The noise energy data is used to indicate noise energy or noise loudness, and the transmission efficiency data is used to indicate quality of a wireless channel between a first device and the second device. The processor 602 may be configured to determine a first bit rate based on the noise energy data, determine a second bit rate based on the transmission efficiency data, and encode an audio stream based on a lower bit rate of the first bit rate and the second bit rate, to obtain audio data. In this embodiment, the transceiver 601 may be further configured to send the audio data to the second device.

For specific content, refer to related descriptions of the first device 100 in the embodiments corresponding to FIG. 4 and FIG. 5. Details are not described herein again.

Figure 6B:
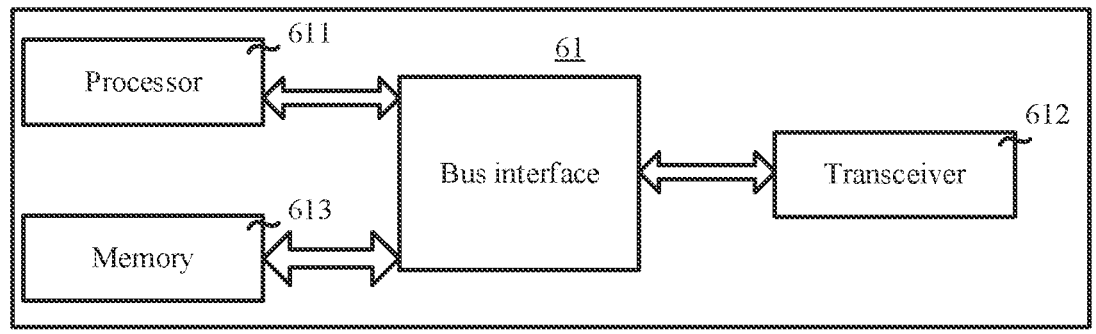
FIG. 6B is a schematic diagram of an example of a structure of an electronic device 61 according to this application.

FIG. 6A describes the first device 100 in this application from a perspective of an independent functional entity. In another implementation scenario, functional entities that run independently may be integrated into one hardware entity, for example, a chip. Correspondingly, as shown in FIG. 6B, in this implementation scenario, an electronic device 61 may include a processor 611, a transceiver 612, and a memory 613. The memory 613 may be configured to store a program/code pre-installed on the electronic device 61, or may store code or the like used for execution by the processor 611.

It should be understood that the electronic device 61 in this application may correspond to the first device in the embodiments corresponding to FIG. 4 and FIG. 5 of this application. The transceiver 612 is configured to perform data receiving and sending in any embodiment shown in FIG. 4 and FIG. 5, and the processor 611 is configured to perform processing other than data receiving and sending of the first device in any embodiment shown in FIG. 4 and FIG. 5. Details are not described herein again.

For specific content, refer to related descriptions of the first device in the embodiments corresponding to FIG. 4 and FIG. 5. Details are not described herein again.

The second device 200 may implement the foregoing corresponding functions in a form of function modules. In some embodiments, the second device 200 may include a processing module and a transceiver module. The transceiver module may be configured to perform data receiving and sending in any embodiment shown in FIG. 4 and FIG. 5. The processing module may be configured to perform an operation other than data receiving and sending in any embodiment shown in FIG. 4 and FIG. 5. For specific content, refer to related descriptions in the embodiments corresponding to FIG. 4 and FIG. 5. Details are not described herein again.

Figure 7A:
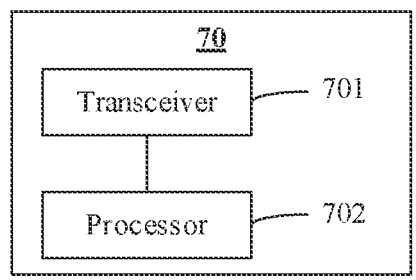
FIG. 7A is a schematic diagram of an example of a structure of an electronic device 70 according to this application.

It may be understood that division of the foregoing modules is merely logical function division. During actual implementation, a function of the transceiver module may be integrated into a transceiver for implementation, and a function of the processing module may be integrated into a processor for implementation. As shown in FIG. 7A, an electronic device 70 includes a transceiver 701 and a processor 702. The transceiver 701 may perform data receiving and sending in any embodiment shown in FIG. 4 and FIG. 5. The processor 702 may be configured to perform an operation other than data receiving and sending in any embodiment shown in FIG. 4 and FIG. 5.

For example, the processor 702 may be configured to determine noise energy data and transmission efficiency data. The noise energy data is used to indicate noise energy or noise loudness, and the transmission efficiency data is used to indicate quality of a wireless channel between a second device and a first device. The transceiver 701 may be configured to: send the noise energy data and the transmission efficiency data to the first device, and receive audio data from the first device. In this embodiment, the processor 702 may be further configured to decode the audio data and play audio obtained by decoding.

For specific content, refer to related descriptions of the second device 200 in the embodiments corresponding to FIG. 4 and FIG. 5. Details are not described herein again.

Figure 7B:
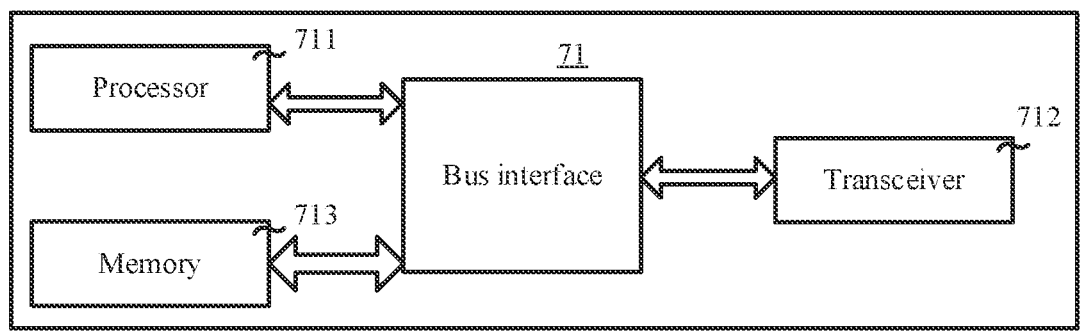
FIG. 7B is a schematic diagram of an example of a structure of an electronic device 71 according to this application.

FIG. 7A describes the second device 200 in this application from a perspective of an independent functional entity. In another implementation scenario, functional entities that run independently may be integrated into one hardware entity, for example, a chip. Correspondingly, as shown in FIG. 7B, in this implementation scenario, an electronic device 71 may include a processor 711, a transceiver 712, and a memory 713. The memory 713 may be configured to store a program/code pre-installed on the electronic device 71, or may store code or the like used for execution by the processor 711.

It should be understood that the electronic device 71 in this application may correspond to the second device in the embodiments corresponding to FIG. 4 and FIG. 5 of this application. The transceiver 712 is configured to perform data receiving and sending in any embodiment shown in FIG. 4 and FIG. 5, and the processor 711 is configured to perform processing other than data receiving and sending of the second device in any embodiment shown in FIG. 4 and FIG. 5. Details are not described herein again.

For specific content, refer to related descriptions of the second device in the embodiments corresponding to FIG. 4 and FIG. 5. Details are not described herein again.

In specific implementation, in correspondence to the foregoing electronic device, this application further provides a computer storage medium. The computer storage medium disposed in any device may store a program. When the program is executed, some or all of the steps in the embodiments of the audio transmission methods provided in FIG. 4 and FIG. 5 may be implemented. A storage medium in any device may be a magnetic disk, an optical disc, a read-only memory (read-only memory, ROM), a random access memory (random access memory. RAM), or the like.

In this application, the transceiver may be a wireless transceiver, for example, may be a wireless local area network transceiver, a cellular network transceiver, or a combination thereof. The processor may be a central processing unit (central processing unit, CPU), a network processor (network processor, NP), or a combination of the CPU and the NP. The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof. The memory may include a volatile memory (volatile memory), for example, a random access memory (random access memory, RAM). The memory may include a non-volatile memory (non-volatile memory), for example, a read-only memory (read-only memory, ROM), a flash memory (flash memory), a hard disk drive (hard disk drive, HDD), or a solid-state drive (solid-state drive, SSD). The memory may further include a combination of the foregoing types of memories.

In FIG. 6B and FIG. 7B, a bus interface may be further included. The bus interface may include any quantity of interconnected buses and bridges that are specifically connected together by circuits that are of one or more processors represented by the processor and of a memory represented by the memory. The bus interface may further link together various other circuits, such as a peripheral device, a voltage regulator, and a power management circuit. This is well known in the art, and therefore is not further described in this specification. The bus interface provides an interface. The transceiver provides a unit configured to communicate with various other devices on a transmission medium. The processor is responsible for managing a bus architecture and normal processing. The memory may store a packet used when the processor is performing an operation.

A person skilled in the art may further understand that various illustrative logical blocks (illustrative logic blocks) and steps (steps) that are listed in embodiments of this application may be implemented by using electronic hardware, computer software, or a combination thereof. Whether the functions are implemented by using hardware or software depends on particular applications and a design requirement of an entire system. A person skilled in the art may use various methods to implement the described functions for each particular application, but it should not be considered that the implementation goes beyond the scope of embodiments of this application.

The various illustrative logical units and circuits described in embodiments of this application may implement or operate the described functions by using a general-purpose processor, a digital signal processor, an application-specific integrated circuit (ASIC), a field-programmable gate array (FPGA) or another programmable logical apparatus, a discrete gate or transistor logic, a discrete hardware component, or a design of any combination thereof. The general-purpose processor may be a microprocessor. Optionally, the general-purpose processor may be alternatively any conventional processor, controller, microcontroller, or state machine. The processor may be also implemented by a combination of computing apparatuses, such as a digital signal processor and a microprocessor, a plurality of microprocessors, one or more microprocessors with a digital signal processor core, or any other similar configuration.

The steps of the methods or algorithms described in embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk drive, a removable magnetic disk, a CD-ROM, or a storage medium of any other form in the art. For example, the storage medium may connect to a processor, so that the processor can read information from the storage medium and write information to the storage medium. Optionally, the storage medium may be further integrated into the processor. The processor and the storage medium may be arranged in an ASIC, and the ASIC may be arranged in an electronic device. Optionally, the processor and the storage medium may be arranged in different components of the electronic device.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions in this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or packet center to another website, computer, server, or packet center in a wired (for example, a coaxial cable, an optical fiber, or a digital subscriber line (DSL)) or wireless (for example, infrared, radio, or microwave) manner. The computer-readable storage medium may be any usable medium accessible by a computer, or a packet storage device, for example, a server or a packet center, integrating one or more usable media. The usable medium may be a magnetic medium(for example, a floppy disk, a hard disk drive, or a magnetic tape), an optical medium(for example, a DVD), a semiconductor medium (for example, a solid-state drive (solid-state drive, SSD)), or the like.

The parts in this specification are all described in a progressive manner, for same or similar parts in the embodiments, refer to these embodiments, and each embodiment focuses on a difference from other embodiments. Especially, apparatus and system embodiments are basically similar to a method embodiment, and therefore are described briefly. For related parts, refer to descriptions in the method embodiment.

Although some embodiments of this application have been described, a person skilled in the art can make changes and modifications to these embodiments once learning the basic inventive concept. Therefore, the appended claims are intended to be construed as to cover the preferred embodiments and all changes and modifications falling within the scope of this application.

It is clear that a person skilled in the art can make various modifications and variations to this application without departing from the spirit and scope of this application. In this way, this application is intended to cover these modifications and variations of this application provided that they fall within the scope of the claims of this application and their equivalent technologies.

What is claimed is:

1. An audio transmission method implemented by a first device, the audio transmission method comprising:
   receiving noise energy data and transmission efficiency data from a second device, wherein the noise energy data indicate noise energy or noise loudness, and wherein the transmission efficiency data indicate quality of a wireless channel between the first device and the second device;
   determining a first bit rate based on the noise energy data;
   determining a second bit rate based on the transmission efficiency data;
   encoding an audio stream based on a lower bit rate of the first bit rate and the second bit rate to obtain audio data; and
   sending the audio data to the second device.

2. The audio transmission method of claim 1, wherein the first bit rate is a first value when the noise energy data is less than a first threshold, wherein the first bit rate is a second value when the noise energy data is greater than the first threshold and less than a second threshold, or wherein the first bit rate is a third value when the noise energy data is greater than the second threshold, wherein the first threshold is less than the second threshold, wherein the first value is greater than the second value, and wherein the second value is greater than the third value.

3. The audio transmission method of claim 2, wherein the first value, the second value, and the third value are all preset fixed values.

4. The audio transmission method of claim 2, wherein the first value, the second value, and the third value are all preset percentages of an initial bit rate corresponding to the audio data.

5. An audio transmission method implemented by a second device, the audio transmission method comprising:
   determining noise energy data and transmission efficiency data, wherein the noise energy data indicate noise energy or noise loudness, and wherein the transmission efficiency data indicate quality of a wireless channel between the second device and a first device;
   sending the noise energy data and the transmission efficiency data to the first device;
   receiving audio data from the first device;
   decoding the audio data to obtain decoded audio data; and
   playing the decoded audio data.

6. The audio transmission method according to of claim 5, wherein determining the noise energy data comprises:
   collecting a noise sound wave;
   performing sampling on the noise sound wave to obtain a digital signal of noise;
   selecting k consecutive sample points in the digital signal, wherein k is an integer greater than or equal to 1;
   computing energy data corresponding to each sample point of the k sample points to obtain k pieces of energy data; and
   using smallest energy data of the k pieces of energy data as the noise energy data.

7. The audio transmission method of claim 6, further comprising:
   performing sampling on the noise sound wave to obtain a digital signal $x(n)$ of the noise, wherein $x(n)$ is greater than $-1$ and less than 1, and wherein n is an integer greater than or equal to 1; and
   determining the noise energy data $l(n)$ according to $l(n) = \min(x^2(n), x^2(n-1), \ldots x^2(n-k))$.

8. The audio transmission method of claim 6 or 7, further comprising:
   performing sampling on the noise sound wave to obtain a digital signal $x'(n)$ of the noise, wherein $x'(n)$ is greater than $x(n)$, and wherein $x'(n)$ is greater than $-1$ and less than 1;
   converting $x'(n)$ into $x(n)$ according to $x(n)=\alpha 1 \times x'(n)$, wherein $\alpha 1$ is greater than 0 and less than 1; and
   determining the noise energy data $l(n)$ according to $l(n) = \min(x^2(n), x^2(n-1), \ldots x^2(n-k))$.

9. The audio transmission method according to claim 6 or 7, further comprising:
   performing sampling on the noise sound wave to obtain a digital signal $x'(n)$ of the noise, wherein $x'(n)$ is greater than $x(n)$, and wherein $x'(n)$ is greater than $-1$ and less than 1;
   determining initial energy data $l'(n)$ according to $l'(n) = \min(x'^2(n), x'^2(n-1), \ldots x'^2(n-k))$; and
   converting the initial energy data $l'(n)$ into the noise energy data $l(n)$ according to $l(n)=\alpha 2 \times l'(n)$, wherein $\alpha 2$ is greater than 0 and less than 1.

10. A first device, comprising:
    a transceiver configured to receive noise energy data and transmission efficiency data from a second device, wherein the noise energy data indicate noise energy or noise loudness, and wherein the transmission efficiency data indicate quality of a wireless channel between the first device and the second device; and
    a processor coupled to the transceiver and configured to:
       determine a first bit rate based on the noise energy data;
       determine a second bit rate based on the transmission efficiency data; and
       encode an audio stream based on a lower bit rate of the first bit rate and the second bit rate to obtain audio data,
    wherein the transceiver is further configured to send the audio data to the second device.

11. The first device of claim 10, wherein the first bit rate is a first value when the noise energy data is less than a first threshold, wherein the first bit rate is a second value when the noise energy data is greater than the first threshold and less than a second threshold or, or wherein the first bit rate is a third value when the noise energy data is greater than the second threshold, wherein the first threshold is less than the second threshold, wherein the first value is greater than the second value, and wherein the second value is greater than the third value.

12. The first device of claim 11, wherein the first value, the second value, and the third value are all preset fixed values.

13. The first device of claim 11, wherein the first value, the second value, and the third value are all preset percentages of an initial bit rate corresponding to the audio data.

14. A second device, comprising:
a processor configured to determine noise energy data and transmission efficiency data, wherein the noise energy data indicate noise energy or noise loudness, and wherein the transmission efficiency data indicate quality of a wireless channel between the second device and a first device; and
a transceiver coupled to the processor configured to:
send the noise energy data and the transmission efficiency data to the first device; and
receive audio data from the first device,
wherein the processor is further configured to:
decode the audio data to obtain decoded audio data; and
play the decoded audio data.

15. The second device of claim 14, wherein the processor is further configured to:
collect a noise sound wave;
perform sampling on the noise sound wave to obtain a digital signal of noise;
select k consecutive sample points in the digital signal, wherein k is an integer greater than or equal to 1;
compute energy data corresponding to each sample point of the k sample points to obtain k pieces of energy data, and
use smallest energy data of the k pieces of energy data as the noise energy data.

16. The second device of claim 15, wherein the processor is further configured to:
perform sampling on the noise sound wave to obtain a digital signal $x(n)$ of the noise, wherein $x(n)$ is greater than −1 and less than 1, and wherein n is an integer greater than or equal to 1; and
determine the noise energy data $l(n)$ according to $l(n)=\min(x^2(n), x^2(n-1), \ldots x^2(n-k))$.

17. The second device of claim 15, wherein the processor is further configured to:
perform sampling on the noise sound wave to obtain a digital signal $x'(n)$ of the noise, wherein $x'(n)$ is greater than $x(n)$, and wherein $x'(n)$ is greater than −1 and less than 1;
convert $x'(n)$ into $x(n)$ according to $x(n)=\alpha 1 \times x'(n)$, wherein $\alpha 1$ is greater than 0 and less than 1; and
determine the noise energy data $l(n)$ according to $l(n)=\min(x^2(n), x^2(n-1), \ldots x^2(n-k))$.

18. The second device of claim 15, wherein the processor is further configured to:
perform sampling on the noise sound wave to obtain a digital signal $x'(n)$ of the noise, wherein $x'(n)$ is greater than $x(n)$, and wherein $x'(n)$ is greater than −1 and less than 1;
determine initial energy data $l'(n)$ according to $l'(n)=\min(x'^2(n), x'^2(n-1), \ldots x'^2(n-k))$; and
convert the initial energy data $l'(n)$ into the noise energy data $l(n)$ according to $l(n)=\alpha 2 \times l'(n)$, wherein $\alpha 2$ is greater than 0 and less than 1.

19. A non-transitory computer-readable storage medium comprising a computer program, wherein when the computer program is run on a computer, the computer is enabled to cause a first device to:
receive noise energy data and transmission efficiency data from a second device, wherein the noise energy data indicate noise energy or noise loudness, and wherein the transmission efficiency data indicate quality of a wireless channel between the first device and the second device;
determine a first bit rate based on the noise energy data;
determine a second bit rate based on the transmission efficiency data;
encode an audio stream based on a lower bit rate of the first bit rate and the second bit rate to obtain audio data; and
send the audio data to the second device.

20. A computer program product comprising instructions that are stored on a non-transitory computer-readable medium and that, when executed by a processor, cause a first device to:
receive noise energy data and transmission efficiency data from a second device, wherein the noise energy data indicate noise energy or noise loudness, and wherein the transmission efficiency data indicate quality of a wireless channel between the first device and the second device;
determine a first bit rate based on the noise energy data;
determine a second bit rate based on the transmission efficiency data;
encode an audio stream based on a lower bit rate of the first bit rate and the second bit rate to obtain audio data; and
send the audio data to the second device.

* * * * *

UNITED STATES PATENT AND TRADEMARK OFFICE
CERTIFICATE OF CORRECTION

| | | |
|---|---|---|
| PATENT NO. | : 12,131,741 B2 | Page 1 of 1 |
| APPLICATION NO. | : 17/799143 | |
| DATED | : October 29, 2024 | |
| INVENTOR(S) | : Dong Shi and Jie Su | |

It is certified that error appears in the above-identified patent and that said Letters Patent is hereby corrected as shown below:

In the Claims

Claim 8, Column 22, Line 28: "claim 6 or 7, further" should read "claim 6, further"

Claim 9, Column 22, Lines 38-39: "claim 6 or 7, further" should read "claim 6, further"

Claim 11, Column 23, Line 2: "second threshold or, or wherein" should read "second threshold, or wherein"

Signed and Sealed this
Third Day of December, 2024

*Katherine Kelly Vidal*

Katherine Kelly Vidal
*Director of the United States Patent and Trademark Office*